Aug. 14, 1945.    M. W. SEYMOUR ET AL    2,382,670

MOTION PICTURE SOUND RECORDS

Filed Dec. 12, 1942

MERRILL W. SEYMOUR
WILLARD D. PETERSON
INVENTORS

BY
ATTORNEYS

Patented Aug. 14, 1945

2,382,670

UNITED STATES PATENT OFFICE 2,382,670

MOTION PICTURE SOUND RECORD

Merrill W. Seymour and Willard D. Peterson, Rochester, N. Y., assignors to Eastman Kodak Company, Rochester, N. Y., a corporation of New Jersey Application December 12, 1942, Serial No. 468,786

6 Claims. (Cl. 101—149.1)

This invention relates to motion picture films having sound records and more particularly to motion picture color films having sound records.

The requirements of a motion picture sound record are well known, perhaps the most important of which is that the record be composed of a material highly absorptive of the radiations to which the photocell in use is sensitive. For the cesium cell a metal sound record, such as silver, is desirable since it absorbs radiations of the order of 800 mu to which the cell has its maximum sensitivity.

In the preparation of prints of motion pictures in color bearing sound records by means of an imbibition process from dyed color separation reliefs it has been a practice to form the sound record in a sensitive photographic film by means of the usual steps of exposure, development and fixation. In order to print by imbibition the three color-separation relief images onto this film bearing the sound record, it is then necessary to mordant the film to make it suitable for transfer of the dye images from the dyed relief images.

The present invention provides a method eliminating the use of a sensitive photographic film in the final step of the imbibition process for recording the sound and picture images, and dispenses with certain processing steps formerly necessary. Also, since the sound record may be obtained from one of the color-component relief films, only three separate relief films may be required for making all imbibition transfers.

One object of the present invention is to provide a method of printing both sound and colored picture images from imbibition matrices onto an imbibition blank.

Another object is to provide a method of printing sound and colored picture images from an imbibition matrix bearing a sound relief image and a color-separation relief picture image onto an imbibition blank. Other objects will appear from the following description of our invention.

The objects of our invention are accomplished in part by a series of steps including forming a relief image of the sound in a sensitive photographic layer, treating this relief image throughout with an organic compound containing either an NH or an SH group, or both, the compound being adapted for imbibition printing by way of its solubility characteristics, and capable of forming a heavy metal salt with, for example, silver salts and capable of being reduced. The organic compound is transferred from the relief image to a mordanted imbibition blank where it reacts or is caused to react with the metal salt to form a sound image of the metal salt of the organic compound. Thereafter, the image is treated with a reducing solution which reduces it to a metal sound image.

Our invention is illustrated as shown in the accompanying drawing where,

Our invention will now be described with particular reference to the accompanying drawing.

Figure 1:
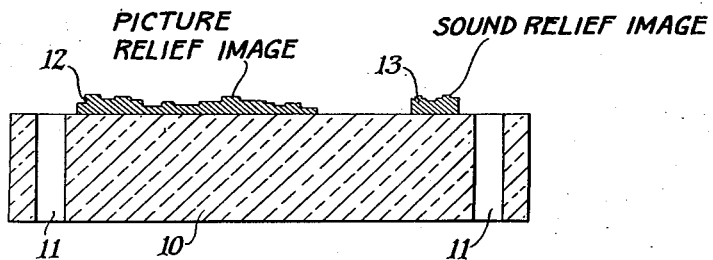
Fig. 1 shows in enlarged cross-sectional view the appearance of a perforated motion picture film carrying sound and picture images in relief.

In a well-known manner, a light-sensitive motion picture film carrying an unhardened gelatin silver-halide emulsion layer suitable for forming relief images, is exposed to a color-separation negative such as the blue-separation negative, carrying the sound image, or if desired the sound may be printed from a separate film; picture and sound relief images are then formed in the layer by the usual method of differentially hardening the gelatin and washing out the unhardened portion of the layer. The result is to obtain a gelatin relief film of the type shown in Fig. 1 where layer 10 is a support of cellulose ester or similar material carrying on one surface thereof between the perforations 11, a picture image relief 12 and the sound relief image 13.

Figure 2:
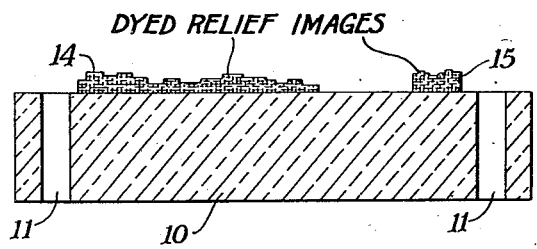
Fig. 2 shows in enlarged cross-sectional view the appearance of the film of Fig. 1 carrying dyed sound and picture relief images.

The relief images are then dyed with a suitable imbibition dye such as a yellow dye if the relief image 12 corresponds to the blue component, or magenta or cyan dye if the relief corresponds to the green or red components respectively. The dyed film appears as shown in Fig. 2 of the drawing according to which the perforated base 10 carried the yellow-dyed picture relief image 14 and the yellow dyed sound relief image 15.

Figure 3:
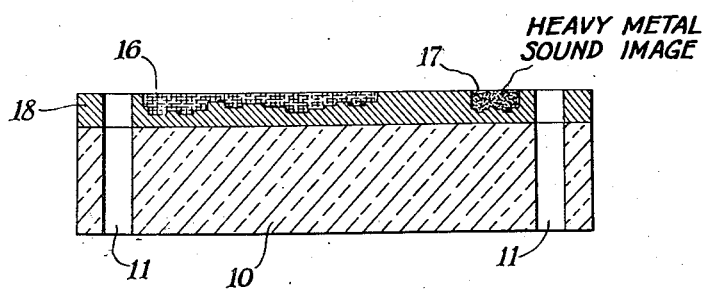
Fig. 3 shows in enlarged cross-sectional view the appearance of a perforated imbibition blank after transferring dyed picture and sound images to it from the relief film of Fig. 2 and processing in the manner of our invention.

According to one aspect of our invention, the dyed relief film is then treated only in the sound track area by means of an applicator roll, or by edge-dipping, with a solution of an azo dye which will form a non-diffusing metal salt when treated with a water-soluble metal salt, for example, the dye obtained by diazotizing anthranilic acid and coupling with thiobarbituric acid. The dyed sound and picture images are then transferred by imbibition to a chrome alum mordanted imbibition blank and the imbibition print is then treated only in the sound area with a solution of water-soluble metal salt, for example, silver nitrate, forming a non-diffusible silver salt of the dye in the sound area. After washing, the silver-dye salt sound image is treated with a reducing solution such as a strong photographic developing solution, sodium hydrosulfite or sodium stannite solutions. The reducing solution reduces the silver dye salt sound image to a silver sound image. The appearance of the imbibition print after processing as described, is shown in Fig. 3 where the perforated support 10 is shown as carrying the gelatin layer 18 containing the imbibed yellow-dyed picture image 16 and the silver sound image 17. After this the remaining dye color-separation matrices are printed by imbibition onto the imbibition blank.

Similarly, if it is desired, the original matrix bearing colorless sound and picture relief images may be dyed with the azo dye selected, only in the sound relief area followed by transfer to the imbibition blank, then forming the metal-dye salt image and after washing, reducing it to a metal sound image as described. Thereafter, the picture relief image of the film from which the sound was taken is dyed up and transferred to the imbibition blank.

In an alternative manner, after the formation of the colorless sound and picture relief images in the film, the whole film may be dyed with the mentioned yellow azo dye, the dye being suitable for use in the final picture image, or other dyes contemplated by the invention, and then both the sound and picture dye images are transferred by imbibition to the mordanted imbibition blank. Thereafer, the imbibition blank is treated only in the sound area with a solution of the metal salt forming a metal-dye salt image which is then washed and converted to a metal sound image by treatment with the reducing solution. Transfers are then made from the remaining dyed color-separation relief films.

On the other hand, we may dye both the sound and picture relief images with the azo dye, the dye being suitable for the final picture image, make the transfer, treat the entire film with the metal salt, wash and then subject only the sound area to the reducing solution.

Other methods of forming a sound image opaque to infra-red radiations include treating the metal-dye salt sound image in the imbibition blank with sulfide, for example, alkali metal sulfide solution in which case a metal sulfide sound image is produced. Certain of the compounds containing an SH group forming a salt with a metal salt, such as mercury or silver salts, may be transferred from the sound relief image to the imbibition blank and upon treatment with the metal salt at a pH greater than 7, a metal sulfide sound image is formed directly.

Metal salts which react with the NH or SH groups of the organic compounds used in our invention to form reducible salts, are salts of the heavy metals, for example, silver, gold, platinum and palladium.

This invention comprises in its broadest aspects for use in treatment of the sound relief image, organic compounds containing in their molecules at least one NH or SH group, or both, which will react with heavy metal salts to form a metal salt thereof, and which compounds are adapted for imbibition printing.

The compounds are characterized by having an imino or mercapto group, or both, which may be in a heterocyclic system or chain. Furthermore, the compounds are characterized that the imino group which they contain is not more than two atoms distant from an atom which has an unshared pair of electrons. The atom which has the unshared pair of electrons may be, for example, a nitrogen atom or a sulfur atom and may be in the heterocyclic ring or chain or attached to an atom which is a member of the ring. It is a well known principle of chemistry that nitrogen may exist with valences of either three or five and that sulfur may exist with valences of two, four or six. When nitrogen has a valence of three, it has therefore an unshared pair of electrons and when sulfur has a valence of two, it has one or two unshared pairs of electrons, as described in Peterson U. S. Patent No. 2,296,306 granted September 22, 1942.

This invention especially comprises for dyeing either the picture or sound reliefs or both relief images, the use of an azo dye having the general structure—

X—N=N—Y in which X is a heterocyclic nucleus having therein a group selected from the class consisting of NH and SH groups and Y is an aryl group having a water solubilizing group, for example, the following compound:

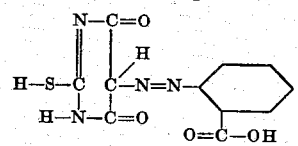

The following are given as examples of compounds, from which Y in the above formula is derivable, suitable for diazotizing and coupling with heterocyclic compounds to form azo dyes of use in our invention: anthranilic, naphthionic, sulfanilic, or metanilic acids and derivatives thereof, containing water solubilizing groups, especially anthranilic acid derivatives of the general formula:

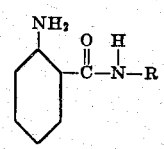

where R is alkyl, heterocyclic, aryl, or one of these groups having a water solubilizing group such as —NH₂, —COOH,

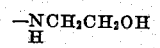

or —SO₂NH₂. It will be noted that these compounds have water solubilizing groups by means of which the diffusion characteristics of the dyes made therefrom may be controlled.

The following compounds are given as examples of heterocyclic compounds containing NH or SH groups which form metal salts, and from which X in the above formula is derivable, and which may be used for coupling with the above compounds to form azo dyes useful in the invention:

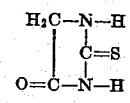

Thiohydantoin

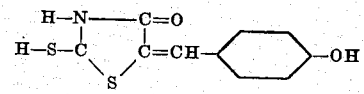

5-p-hydroxy benzal rhodanine

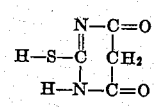

Thiobarbituric acid

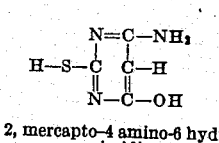

2, mercapto-4 amino-6 hydroxy pyrimidine

Azo dyes useful in the invention may also be prepared by diazotization of a heterocyclic compound and coupling with the compound containing the solubilizing group, for example, the following:

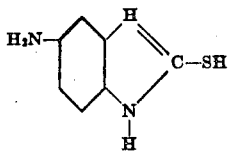

5-amino mercapto benzimidazole

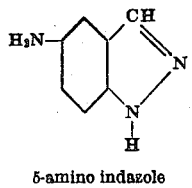

5-amino indazole

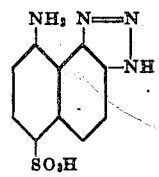

9-amino (1,2-naphthatriazole)6-sulfonic acid may be diazotized and coupled with the aromatic compound having the solubilizing group, such as anthranilic acid and sulfanilic acid.

Also, the compound used for treatment of the sound relief image and which is subsequently treated with the metal salt and reduced to a metal sound image, need not be a dye, it may, for example be—

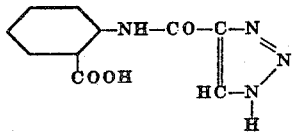

or

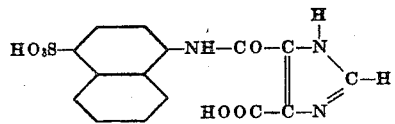

Other dyes, of which the following are representative, may be used for forming the metal sound image.

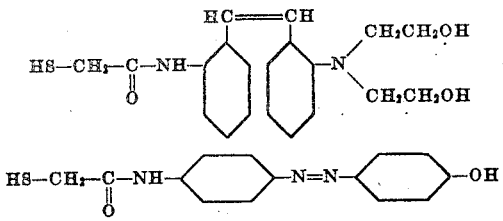

In the specification and the appended claims where we refer to the organic compounds as being adapted for imbibition printing, it is to be understood that this means that the compounds have molecular size and diffusion characteristics which make them suitable for transferring them from a colloid relief image, such as gelatin, to an imbibition blank with good definition. To this end, as above mentioned, the diffusion characteristics of the compound may be controlled by choice of solubilizing groups or size or kind of the aryl or heterocyclic groups on the dye molecule. The diffusion characteristics may also be controlled by regulation of the pH at which the transfer is made.

Mordants which may be used in the imbibition blank are those listed in the literature as suitable for use in dyeing, for example, salts of the following elements: aluminum, chromium, copper, iron, nickel, cobalt, titanium, zirconium, tin, lead, zinc, cadmium, antimony, manganese, silver, bismuth, uranium, tungsten, molybdenum, thorium, vanadium, and cerium.

The various embodiments of our invention mentioned above may be used in forming variable density or variable area sound track images.

It is to be understood that the disclosure herein is by way of example and that other modifications are possible within the scope of the appended claims, and that we consider as included in our invention all modifications and equivalents falling within the scope of the appended claims.

What we claim is:

1. The method of recording sound photographically which comprises forming a relief image of the sound, treating said relief image with an organic compound containing a heterocyclic nucleus having an NH group not more than two atoms distant from an atom which has an unshared pair of electrons, said compound being adapted for imbibition printing and capable of forming a non-diffusible salt of a metal, transferring said compound from said relief image to an imbibition blank, reacting said transferred compound with a salt of a heavy metal capable of forming a non-diffusible salt with said organic compound to form a sound image of the metal salt of said compound, and treating said image with a solution reducing it to a metal sound image.

2. The method of recording sound photographically which comprises forming a relief image of the sound, treating said relief image with an organic compound having an NHCOCH$_2$SH group, said compound being adapted for imbibition printing and capable of forming a non-diffusible salt of a metal, transferring said compound from said relief image to an imbibition blank, reacting said transferred compound with a salt of a heavy metal capable of forming a non-diffusible salt with said organic compound to form a sound image of the metal salt of said compound, and treating said image with a solution reducing it to a metal sound image.

3. The method of recording sound photographically which comprises forming a relief image of the sound, treating said relief image with an azo dye having the formula X—N=N—Y in which X is a heterocyclic nucleus having therein a group selected from the class consisting of NH not more than 2 atoms distant from an atom which has an unshared pair of electrons, and SH groups and Y is an aryl group having a water solubilizing group, said azo dye being adapted for imbibition printing and capable of forming a silver salt, transferring said azo dye from said relief image to an imbibition blank, reacting said transferred azo dye with a water soluble silver salt to form a silver-dye salt sound image, and treating said image with a solution reducing said image to a silver sound image.

4. The method of recording sound photographically which comprises forming a relief image of the sound, treating said relief image with an azo dye having the formula X—N=N—Y in which X is a heterocyclic nucleus having therein an SH group and Y is an aryl group having a water solubilizing group, said azo dye being adapted for imbibition printing and capable of forming a silver salt, transferring said azo dye from said relief image to an imbibition blank, reacting said transferred azo dye with a water soluble silver salt to form a silver-dye salt sound image, and treating said image with a solution reducing said image to a silver sound image.

5. The method of recording sound photographically which comprises forming a relief image of the sound, treating said relief image with an azo dye having the formula X—N=N—Y in which X is a thiobarbituric acid group and Y is an aryl group having a water solubilizing group selected from the class consisting of —CONHNH$_2$, —CONHCOOH, —CONHNHCH$_2$CH$_2$OH, —CONHSO$_2$NH$_2$, —COOH and —SO$_3$H groups, said azo dye being adapted for imbibition printing and capable of forming a silver salt, transferring said azo dye from said relief image to an imbibition blank, reacting said transferred azo dye with a water soluble silver salt to form a silver dye salt sound image, and treating said image with a solution reducing said image to a silver sound image.

6. The method of recording sound photographically which comprises forming a relief image of the sound, treating said relief image with an organic compound having an NH group not more than two atoms distant from an atom having an unshared pair of electrons, said compound being adapted for imbibition printing and capable of forming a silver salt, transferring said compound from said relief image to an imbibition blank, reacting said transferred compound with a silver salt to form a sound image of the silver salt of said compound, and treating said image with a solution reducing it to a silver sound image.

MERRILL W. SEYMOUR.
WILLARD D. PETERSON.